United States Patent [19]
Listerman

[11] 3,761,712
[45] Sept. 25, 1973

[54] GAUGE FOR DETERMINING THE PERCENTAGE BY WEIGHT OF MOISTURE CONTAINED IN A BULK MATERIAL TRANSPORTED ON A MOVING CONVEYOR

[75] Inventor: Paul L. Listerman, Cincinnati, Ohio

[73] Assignee: The Ohmart Corporation, Cincinnati, Ohio

[22] Filed: May 11, 1971

[21] Appl. No.: 142,161

[52] U.S. Cl............................ 250/388, 250/392
[51] Int. Cl............................................. G01n 23/06
[58] Field of Search................ 250/43.5 D, 83.3 D, 250/84, 83.1

[56] References Cited
UNITED STATES PATENTS

| | | | |
|---|---|---|---|
| 3,431,415 | 3/1969 | Stone et al. | 250/83.3 D X |
| 3,489,901 | 1/1970 | Brown | 250/83.3 D |
| 3,600,574 | 8/1971 | Glaza et al. | 250/83.3 D |

Primary Examiner—Archie R. Borchelt
Attorney—Wood, Herron & Evans

[57] ABSTRACT

A moisture gauge including a radiation source for irradiating with fast neutrons and gamma radiation a bulk substance having moisture contained therein, an analog detector responsive to gamma radiation which has interacted with a predetermined fractional cross-sectional area of the bulk substance to produce a first electrical signal of an analog-type, the amplitude of which is correlated to the instantaneous total weight of the bulk substance including contained moisture, and a pulse-type detector which is responsive to slow neutrons generated by the interaction of fast neutrons and hydrogen atoms of the contained moisture in said predetermined fractional cross-sectional area to produce a second electrical signal of a pulse-type, the pulse rate of which is correlated to the weight of the moisture contained in the bulk substance. The electrical signals generated by the pulse-type slow neutron detector and the analog-type gamma detector are separately accumulated for predetermined intervals, with the slow neutron and gamma accumulating intervals being both equal and synchronized and preferably in the range of 20–80 seconds. An electrical circuit divides the successive moisture weight accumulation signals and the successive total weight accumulation signals to provide successive outputs correlated to the percentage by weight of moisture contained in the bulk substance passing through the gauge during the successive accumulation intervals.

6 Claims, 19 Drawing Figures

GAUGE FOR DETERMINING THE PERCENTAGE BY WEIGHT OF MOISTURE CONTAINED IN A BULK MATERIAL TRANSPORTED ON A MOVING CONVEYOR

This invention relates to moisture gauges, and more particularly to moisture gauges of the type which measure the percentage by weight of moisture contained in a bulk substance transported through the gauge on a moving conveyor.

Gauges of the general type to which this invention relates include a first source of radiation, for example, gamma radiation, which irradiates the bulk material, either from above or below the belt on which the bulk material is conveyed. The gamma radiation is attenuated by the bulk material to an extent dependent upon, among other things, its mass including the moisture contained in it. The transmitted gamma radiation is then detected to provide an electrical signal correlated to the total weight of the bulk material including contained moisture.

A second source of radiation, preferably fast neutrons, is also included in the typical prior art moisture gauge, and impinges fast neutrons upon the bulk material from a position either below or above the belt. The fast neutrons interact with the hydrogen atoms of the moisture contained in the bulk material, and in the process produce slow neutrons which are detected to produce an electrical signal correlated to the hydrogen atoms in the bulk material, and more particularly to the mass of the hydrogen-containing moisture in the bulk material. The moisture and total weight signals are then manipulated arithmetically, for example, divided, to produce an output correlated to the percentage by weight of moisture contained in the bulk material.

In accordance with one prior art proposal wherein the two detector outputs are divided to provide a useful measurement, both detectors are of the pulse-type wherein their respective outputs are in the form of pulses whose rates are proportional to the slow neutron and gamma radiation detected, respectively. In this proposal the pulse outputs of each of the slow neutron and gamma radiation detectors are input to separate analog RC rate meter circuits. These circuits function to provide analog output signals having amplitudes correlated to the pulse rates input thereto from the respectively associated pulse-type detectors. The analog signals are then divided to produce a signal correlated to the weight percentage moisture of the bulk material. This signal processing arrangement, if to have maximum accuracy, particularly in batch-type operations, requires that the RC time constants of each rate meter circuit be equal. Not only is it difficult to initially set the time constants equal, but it is also difficult to maintain them equal, assuming they are once initially made equal.

It is an objective of this invention to provide a signal processing circuit for a two-channel moisture gauge in which one channel uses a first detector and the other channel utilizes a second detector, and wherein the two channel detector outputs are divided to provide a useful measurement. This objective has been accomplished in accordance with the principles of this invention by combining, with the first channel detector and the second channel detector, two accumulating circuits which cyclically accumulate for equal and synchronized intervals the output from the first detector and the output from the second detector, and then utilizing a divider which is responsive to the successive outputs of the respective accumulating circuits for producing an output correlated to the percentage by weight of moisture of the bulk substance. By utilizing accumulating circuits which separately accumulate the respective outputs of the two channels for intervals which are both synchronized and equal, a percent by weight moisture measurement is obtained in which measurement error is minimized.

If the accumulating intervals of each of the two detector channels are not synchronized and equal, errors can result. For example, if the accumulating intervals of the channel detector outputs are not synchronized, the accumulated amount of the moisture channel does not correspond to the same bulk material mass passing through the gauge as the accumulated amount of the total weight channel. Thus, when two unsynchronized accumulation signals are divided, the quotient obtained is not the weight percentage moisture for the same mass of bulk substance passing through the gauge, but rather is based on two different samples. If the accumulation intervals of the two channels are unequal, the accumulated channel outputs also correspond to non-identical samples of the bulk material passing through the gauge, and as a consequence, also produce an erroneous moisture measurement when divided.

A further advantage of this invention is that it provides an accurate percent moisture measurement regardless of the type of detectors in each channel. Accurate results are obtained when the channels both have pulse-type detectors, analog-type detectors, or a combination of each.

These and other advantages and objective of the invention will become more readily apparent from a detailed description thereof taken in connection with the drawings, in which:

FIGS. 13($a$), 13($b$) and 13($c$) are schematic elevational views of a longitudinal section of a conveyor belt illustrating slow neutron and gamma radiation accumulating intervals which are equal and synchronized, unequal, and equal but unsynchronized, respectively;

FIGS. 14($a$), 14($b$), 14($c$) and 14($d$) are schematic elevational views of a gauge of this invention, and is useful in illustrating the insensitivity of the gauge of this invention to variations in vertical position of the belt relative to the source and defector/reflector.

Figure 1:
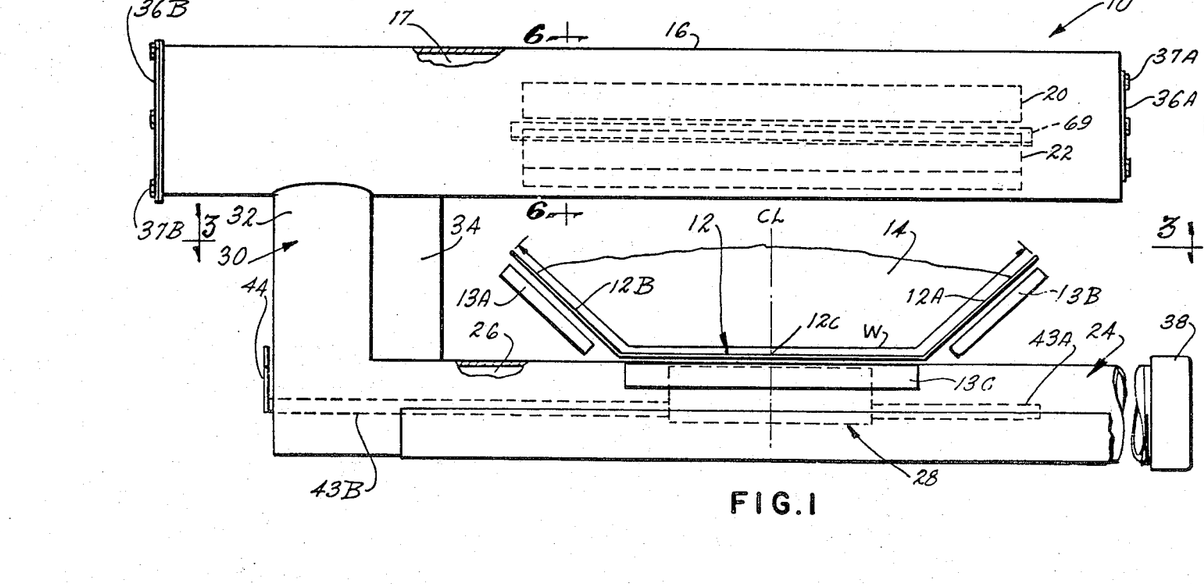
FIG. 1 is a front elevational view of a preferred embodiment of the moisture gauge of this invention.
Figure 2:
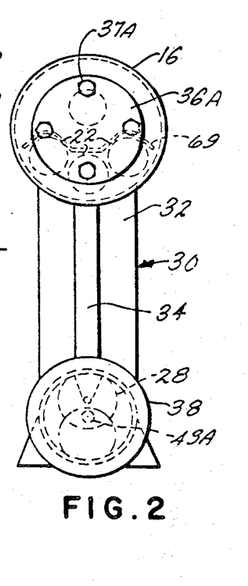
FIG. 2 is a right side elevational view of the gauge of FIG. 1.
Figure 3:
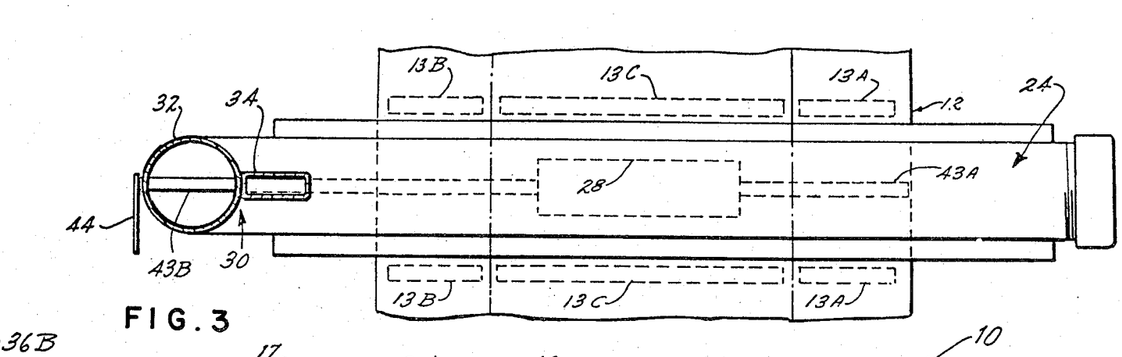
FIG. 3 is a cross-sectional view taken along lines 3—3 of FIG. 1.

With particular reference to FIGS. 1–3, the moisture gauge includes a generally C-shaped frame 10 operatively positioned in use to substantially surround a moving conveyor belt 12 which transports bulk materials 14, the percentage by weight of moisture of which is to be measured. The cross-sectional profile of the belt 12 is established by sets of idler rolls 13A, 13B and 13C, located at spaced intervals along the length of the belt 12, on which sides 12A and 12B and bottom 12C of the belt guide. The C-shaped frame 10, which is stationarily supported relative to the belt by conventional means (not shown), includes an upper horizontal arm 16 overlying the belt 12 and bulk material 14. Arm 16 is in the form of a hollow metal tube, preferably steel, in the central and hollow cavity 17 of which is positioned a gamma detector 20 and a slow neutron detector 22. The C-shaped frame 10 also includes a lower horizontal arm 24 positioned below the bulk material conveying belt 12. The lower arm 24 is also preferably in the form of a steel tube and houses in its hollow interior cavity 26 a combined gamma and fast neutron radiation source holder 28, shown in more detail in FIGS. 4 and 5. Rigidly interconnecting the upper and lower arms 16 and 24 of the C-shaped frame 10 is a vertical arm 30 in the form of a circular tube 32 and a rectangular tube 34 which, in addition to being welded along their length to each other, are welded at their upper and lower ends to the upper and lower arms 16 and 24. To facilitate access to the upper and lower arms 16 and 24 for the purpose of insertion and removal of the detectors 20 and 22 and the combined source holder 28, plates 36A and 36B and a cap 38 are secured to the opposite ends of the upper arm and to one end of the lower arm, respectively. The plates 36A and 36B can be secured in any suitable fashion, such as by bolts 37A and 37B; the cap 38 is preferably threaded on the open end of the lower arm 24.

Figure 4:
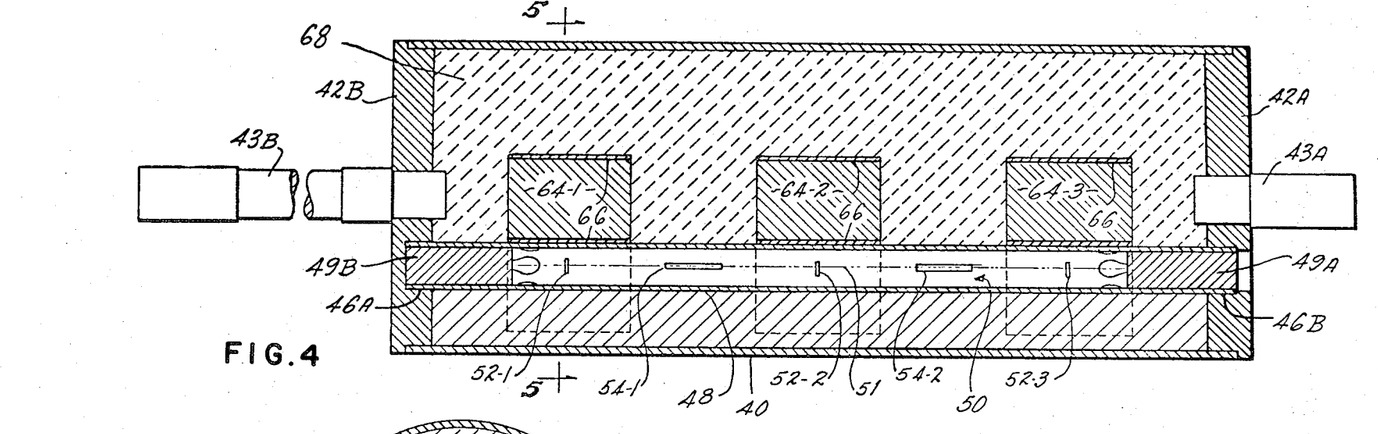
FIG. 4 is a vertical cross-sectional view of an improved fast neutron and gamma source and source holder particularly useful in measuring percentage by weight of moisture in bulk materials having a relatively high percentage of moisture.
Figure 5:
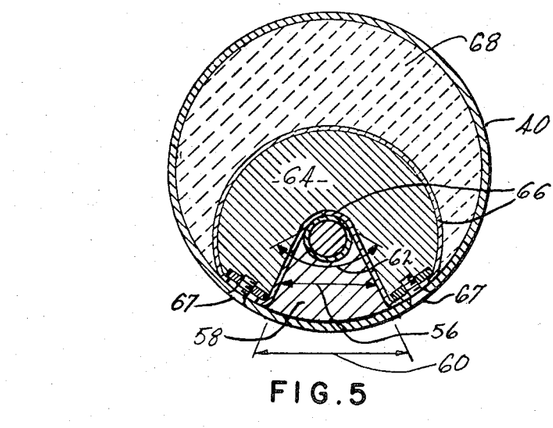
FIG. 5 is a cross-sectional view taken along lines 5—5 of FIG. 4.

The source holder 28, which is particularly useful in measuring the weight percentage moisture content of bulk materials having a relatively high percentage moisture, is shown in more detail in FIGS. 4 and 5. With reference to these figures, the source holder 28 is seen to include a hollow steel tube 40, to the opposite ends of which are press fit circular end plates 42A and 42B. Coaxial shafts 43A and 43B press fit in holes formed in the center of the end plates 42A and 42B, extend outwardly from opposite ends of the source holder 28. Shafts 43A and 43B are journalled in stationary bearings (not shown) in the C-frame 10 for facilitating location of the source holder 28 about its longitudinal axis between an operative position (shown in dotted lines in FIG. 2) and inoperative position (shown in phantom lines). A handle 44 (FIGS. 1 and 3), fixedly secured to the free end of the shaft 43B projecting from the vertical arm 30 of the C-frame 10 permits rotation of the source holder 28 between its operative and inoperative positions.

Positioned within the tube 40 and located parallel to, but radially offset from, the axis thereof by apertures 46A and 46B formed in end plates 42A and 42B is a hollow steel tube 48. Positioned within the tube 48 between end plugs 49A and 49B is a solid source rod 50, preferably stainless steel. Formed in the surface of the source rod 50 along a common line 50 parallel to the longitudinal axis of the rod are three circumferential slots 52-1, 52-2 and 52-3, measuring approximately 1/16 inches in a direction parallel to line 52. Slot 52-2 is located centrally relative to the opposite ends of the source rod 50, while slots 52-1 and 52-3 are located on opposite sides of the central slot 52-2 and a distance therefrom of 4½. Each of the slots 52-1, 52-2 and 52-3 contain gamma radiation-emitting material, each slot preferably containing 15 millicuries of radioactive Cesium 137, which emits gamma radiation having an energy of 0.66 mev. Also formed in the surface of the source rod 50 along line 51 are two axially extending slots 54-1 and 54-2. Slot 54-1 is located midway between gamma-emitting slots 52-1 and 52-2, while slot 54-2 is located midway between gamma-emitting slots 52-2 and 52-3. Slots 54-1 and 54-2 measure 1 inch in an axial direction. Slots 54-1 and 54-2 each contain 0.75 curies of fast neutron-emitting material, e.g., Americium-Berylium. A source rod 50 containing gamma source slots 52-1, 52-2 and 52-3 and fast neutron source slots 54-1 and 54-2 distributed along the length of the source holder 28 as described has in practice been found particularly useful in moisture gauging applications wherein the percentage moisture of a bulk material having a relatively high percentage moisture is to be measured.

For the purpose of preventing radiation from gamma sources slots 52-1, 52-2 and 52-3 and fast neutron source slots 54-1 and 54-2 in unwanted directions, the source holder 28 includes protective shielding 64 and 68 which limits the radiation emitted to an angle 56. A filler material, such as aluminum, which is transparent to gamma and fast neutron radiation is inserted in the angular region 58. Insert 58 extends ina longitudinal direction along the source rod 50 between the end plates 42A and 42B, and between the arcuate segment 60 of the tube 40 and arcuate segment 62 of the source rod holder 48. Insert 58, which as a substantially trapezoidal cross-section, is symmetrically disposed on either side of the longitudinal line 52 in the surface of the source rod 50.

Shielding 64, which inhibits gamma radiation from the slots 52-1, 52-2 and 52-3 except through the angle 56, includes lead shields 64-1, 64-2 and 64-3. Shields 64-1, 64-2 and 64-3 are adjacent the source rod holder 48 at points symmetrically located relative to slots 52-1, 52-2 and 52-3, respectively. The shields 64-1, 64-2 and 64-3 are in the form of solid right cylinders having a pie-shaped portion removed to accommodate the radiation transparent aluminum window 58. The gamma shields 64-1, 64-2 and 64-3 are secured in place by brackets 66 secured to the tube 40 by machine screws 67.

To prevent fast neutron emission from the source holder 28 in the direction other than through the angle 56 defined by the aluminum window 58, the interior of the tube 40, except for that portion occupied by the gamma shields 64-1, 64-2 and 64-3, source rod holder 48 and aluminum radiation transparent window 58, is filled with fast neutron absorbing material 68. Fast neutron shield 68 preferably is in the form of a hydrogenous, water extended polyester potting material, which is poured into the tube 40 in liquid form and allowed to solidify.

For reasons which will become apparent hereafter, it is noted that the source 28 extends transversely across the belt 12, that is, in a direction parallel to the width of the belt, a distance substantially less than the entire width W of the belt. In accordance with a preferred embodiment, the source 28 extends transversely across the belt 12 a distance equal to approximately one-third the belt width W, although a transverse extension of the source 28 relative to the belt width W in the range of one-fourth to three-fourths is possible. Also noted, and for reasons to become apparent hereafter, the source 28 is disposed centrally of the belt 12 in the direction of its width W. That is, the source 28 is substantially symmetrical relative to the center line CL of the belt 12.

Figure 7:
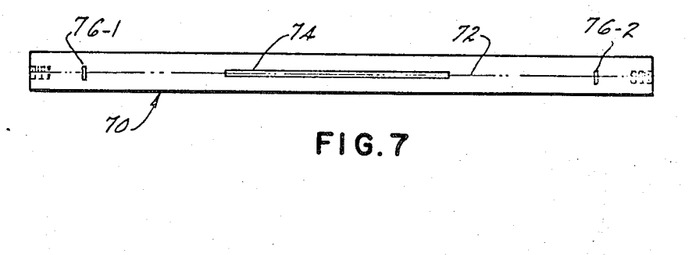
FIG. 7 is a top plan view of a fast neutron and gamma radiation source rod, useful as a substitute for the source rod depicted in FIG. 4, for measuring the percentage by weight of moisture in bulk materials having relatively low percentage moisture.

As indicated previously, the source 28 by virtue of the particular arrangement of individual fast neutron and gamma radiation sources is particularly useful in measuring percentage moisture of bulk materials having a relatively high percentage moisture content. With reference to FIG. 7, a soruce rod 70 is disclosed which, when substituted for the source rod 50 of source holder 28 depicted in FIG. 4 and appropriate structural changes are made for shielding, provides a gauge which is particularly useful in measuring the weight percentage moisture content of bulk materials having a relatively low percentage of moisture. As depicted in FIG. 7, the soruce rod 70 is preferably a solid steel rod having a generally circular cross-section. Formed in the surface of the rod 70 along a line 72 parallel to the axis thereof is a centrally disposed fast neutron-emitting source slot 74 spaced midway between two gamma-emitting source slots 76-1 and 76-2. The fast neutron source slot 74 is approximately two inches in length measured in a direction along line 72.

Positioned in slot 74 is 8 curies of a fast neutron-emitting radioactive material, preferably Plutonium 238-Lithium. Alternatively, Americium-241-Lithium may be placed in slot 74. Slots 76-1 and 76-2, which are symmetrically disposed relative to the slot 74 and approximately 4 and ½ inches axially displaced therefrom, contain gamma-emitting radioactive material, preferably 20 millicuries of Cesium-137.

The source holder 28 of FIG. 4, when provided with the source rod 70 as a substitute for the source rod 50, is useful in applications where the percentage moisture content of the bulk materials being measured is relatively low, such as is the case with sinter mix. Whereas, when the source holder 28 is provided with the source rod 50 shown in FIG. 4, the gauge is pargicularly adapted for measuring the percentage moisture of relatively high moisture content bulk materials, such as wood chips utilized in the manufacture of paper products.

Figure 6:
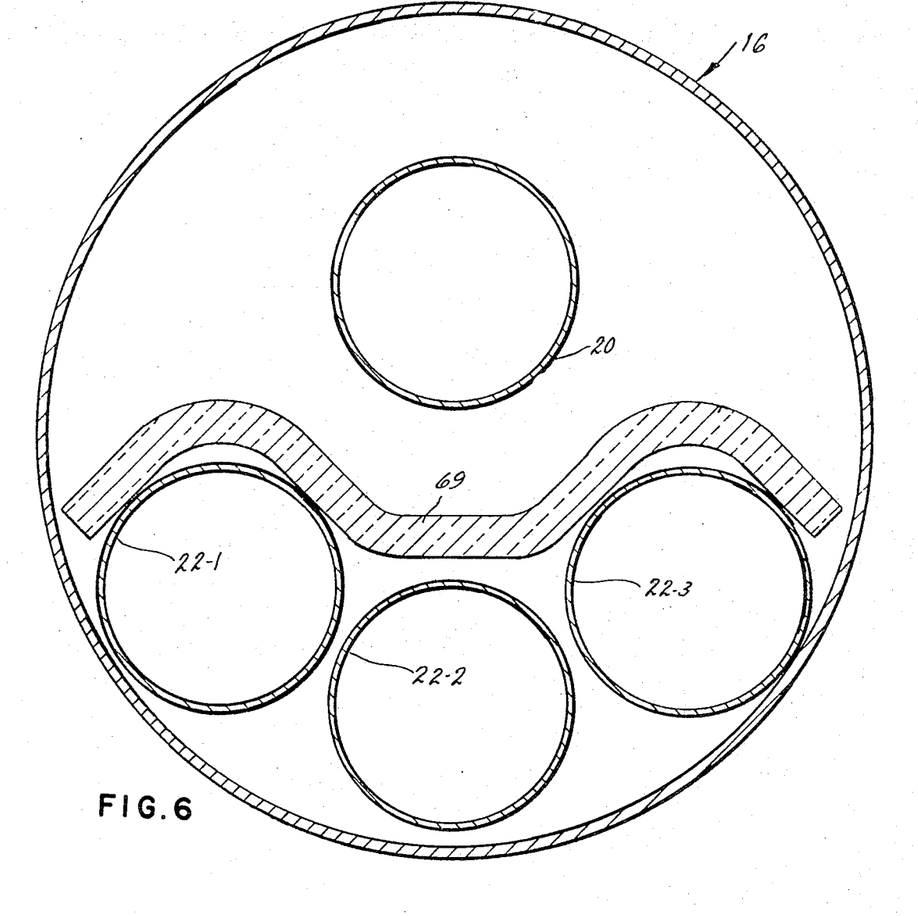
FIG. 6 is a cross-sectional view taken along lines 6—6 of FIG. 1, showing in detail the configuration and relative orientation of the gamma and slow neutron detectors.

As shown in FIGS. 1 and 6, located in the upper arm 16 of the C-frame 10 is a gamma detector 20, and three identical slow neutron detectors 22-1, 22-2 and 22-3 which are disposed parallel to each other and to the gamma detector 20. The gamma detector 20 is preferably in the form of an elongated cylindrical ion chamber having an active length roughly equal to the transverse dimension, or width, of the belt 12. The length of the gamma detector 20 is not critical in the preferred embodiment of FIGS. 1-7, so long as it is at least equal to the transverse dimension of the cross-sectional area of the bulk material irradiated by the source 28. The gamma detector 20 in accordance with one preferred form is filled with a noble gas, such as argon or xenon. The gamma detector 20 is located in the upper section of the horizontal arm 16.

Located below the gamma detector 20 are the three slow neutron detectors 22-1, 22-2 and 22-3. The slow neutron detectors are each in the form of an elongated cylindrical tube having an active length roughly equal to the transverse dimension of the belt 12, although as with the gamma detector 20 the length of the slow neutron detectors is not critical so long as they are at least as long as the transverse dimension of the cross-section of the bulk material irradiated by the source. Preferably the slow neutron detectors are proportional counters filled with boron trifluoride gas. Located above the slow neutron detectors 22-1, 22-2 and 22-3 is an elongated neutron reflector 69 which directs back into the bulk material 14 fast neutrons which have been transmitted from the source 28 through the bulk material 14 without a hydrogen collision, i.e., withlut slowing or being transformed into a slow neutron. The neutron reflector 69, which obviously should be relatively transparent to gamma radiation to facilitate detection thereof by the gamma detector 20 positioned above, preferably is fabricated of hydrogenous material such as a cast sheet of methyl methacrylate, a thermoplastic acrylic resin. While under certain conditions a single slow neutron detector may be utilized, it has been found in practice that the use of three slow neutron detectors, the electrical outputs of which are summed, provides an electrical signal strength sufficient to facilitate electrical processing with well-known and conventional electrical circuit components.

Figure 8:
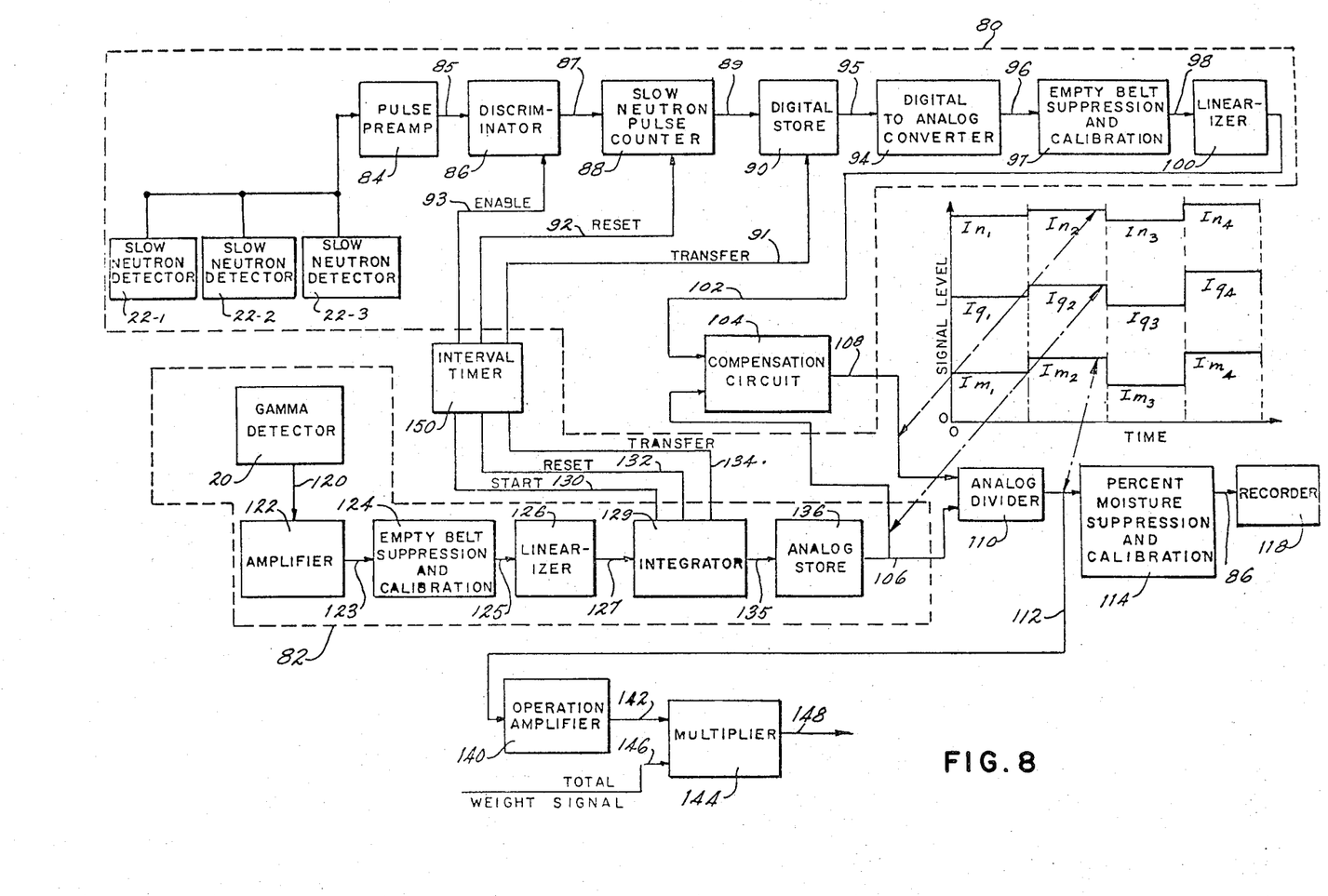
FIG. 8 is a schematic diagram, in block format, of an electrical signal processor for operating on the moisture weight and total weight signal detector outputs to produce a weight percentage moisture indication.

An electrical circuit capable of processing the outputs of the gamma and slow neutron detectors 20 and 22, and providing an electrical output correlated to the percentage by weight of moisture in a bulk material, such as sinter mix, wood chips or the like, as well as the bone dry weight of the bulk material, is depicted in FIg. 8. With reference to this figure, the circuit is seen to include a moisture weight channel 80 and a total weight channel 82, the outputs of which are divided to provide on line 86 an electrical signal correlated to the percentage by weight of moisture in the bulk material 14 on the conveyor belt 12. The moisture weight channel 80 includes the three slow neutron detectors 22-1, 22-2 and 22-3, the respective electrical outputs of which are summed and input to a pulse preamplifier 84 where suitable amplification of the summed pulses output from the neutron detectors 22-1, 22-2 and 22-3 occurs. The pulse rate of the input pulses to the pulse preamplifier 84 is proportional to the number of fast neutrons from the source 20 which have been slowed down in the process of passing through the conveyor belt 12 and the moisture-containing bulk material 14.

If the conveyor belt 14 is hydrogenous, such as if fabricated of rubber, some of the fast neutrons emitted by the source in passing through the belt are slowed, resulting in the production of slow neutrons which are detected by detectors 22-1, 22-2 and 22-3. Hence, a hydrogenous belt 12 contributes pulses to the output of the detector 22-1, 22-2, 22-3 input to the pulse preamplifier 84. Similarly, if the bulk material, exclusive of any moisture it may contain, is also hydrogenous, such as is the case when the bulk material is wood chips, fast neutrons from the source 28 are slowed down in the course of passing through the hydrogenous bulk material (moisture excluded) with the result that a component of the signal output from the detectors 22-1, 22-2 and 22-3 and input to the pulse preamplifier 84 is attributable to the hydrogenous elements of the bulk material. Finally, the moisture in the bulk material 14, since it contains hydrogen, slows down fast neutrons from the source holder 28, producing a pulse component output from the slow neutron detectors 22-1, 22-2 and 22-3 which is input to the pulse preamplifier 84. A further pulse component in the output of the slow neutron detectors 22-1, 22-2 and 22-3 is attributable to gamma radiation detected by the slow neutron detectors. The gamma radiation pulse component has an amplitude which is significantly lower than the amplitude of the slow neutrons produced by the hydrogenous belt, hydrogenous material (other than moisture) in the bulk substance being measured, and the hydrogenous moisture itself.

The output of the pulse preamplifier is input on line 85 to a discriminator circuit 86. The discriminator circuit 86 functions in a well-known manner to pass and provide on its output line 87 only those input pulses which exceed a predetermined amplitude level, which amplitude level is below the amplitude of slow neutron pulses, but above the amplitude of gamma pulses and other electrical noise. Thus, the discriminator circuit 86 discriminates against pulses output from the slow neutron detectors 22-1, 22-2 and 22-3 other than those produced by slow neutrons. Responsive to the output of the discriminator 86 on line 87 is a slow neutron pulse counter 88 which functions to count slow neutron pulses passed by the discriminator 86 during successive predetermined equal time intervals $I_{n1}, I_{n2}, I_{n3}, I_{n4}, \ldots$. Counter 88 is reset at the end of each counting interval $I_{n1}, I_{n2}, I_{n3}$ and $I_{n4}$ by a reset signal on line 92 output from an interval timer 150. A digital store 90 has its input line 89 connected to the output of the slow neutron pulse counter 88. The digital store 90 stores the count accumulated by the neutron pulse counter 88 for a given interval $I_{n1}, I_{n2}, I_{n3}, I_{n4}, \ldots$ upon receipt of a transfer signal on line 91. The discriminator 86 is operational to both discriminate and pass low neutron pulses to counter 88 only when enabled by an enable signal on line 93, which signal is present only during intervals $I_{n1}, I_{n2}, I_{n3}, I_{n4}, \ldots$ time a digital/analog converter 94 in response to the output of the digital store 90 on line 95 produces on its output line 96 an analog signal which at any time is correlated to the count present in the digital store. The count in the digital store 90 at any given time is correlated to the total hydrogen in the belt 12, the bulk material 14 (exclusive of moisture), and the moisture in the bulk material for the preceding complete interval $I_{n1}, I_{n2}, I_{n3}, I_{n4}, \ldots$.

The analog signal on line 96 is input to an empty belt suppression and calibration circuit 97. This circuit performs two functions. First, it subtracts from the input signal on line 96 a component of the input signal correlated to the average hydrogen in the belt 12 per unit length, thereby nominally "zeroing out," on an average basis, the moisture weight channel 80 for an empty belt, that is, a belt without bulk material 14 thereon. The second function of the circuit 97 involves adjusting the gain thereof such that maximum moisture represents a full scale value.

A linearizing circuit 100 is responsive to the output of the suppression and calibration circuit 97 on line 98, and functions to provide on its output line 102 an analog signal, the amplitude of which is a linear function of the hydrogen in the bulk material itself as well as the hydrogen in the moisture contained in the bulk material. A compensation circuit 104 is responsive to the output of the linearizer 100 on line 102, and also to an input on line 106, to be described, correlated to the total weight of the bulk material on the belt, including the moisture contained therein. The compensation circuit subtracts from the signal input on line 102, which signal has a component correlated to hydrogen in the moisture contained in the bulk material, a signal having an amplitude correlated to the hydrogen content of the bulk material 14. The signal which is subtracted corresponds to a predetermined percentage of the signal on line 106 correlated to the total weight of the bulk substance 14 and the moisture contained therein. The output on line 108 from the compensation circuit 104 is an analog signal correlated to the hydrogen content, and hence the weight, of the moisture in the bulk material 14 exclusive of the hydrogen content and weight of both the bulk material itself and the hydrogen content and weight of the belt 12.

The analog moisture weight signal on line 108 is input to a divider 110, the other input of which is responsive to the total bulk material (moisture included) weight signal on line 106. The analog divider circuit 110 provides on its output line 112 an analog signal correlated to the quotient of the moisture weight signal on line 108 and the total weight signal on line 106, the quotient signal on line 112 being correlated to the percentage by weight of the moisture in the bulk material. The percentage moisture signal on line 112 is input to a suppression and calibration circuit 114 which functions to set the output on line 106 to a zero value corresponding to the lowest weight percent moisture to be encountered in a particular application. Circuit 114 also has a gain which can be set to produce a full scale deflection of a recorder 118 of the like for the maximum weight percentage moisture likely to be encountered in a given application.

The total weight channel 82 includes the gamma detector 20, the electrical output of which on line 120 is an analog signal whose amplitude is correlated to the intensity of the gamma radiation detected by the detector 20. Responsive to the gamma detector output on line 120 is an amplifier 122 having an output on line 123. An empty belt suppression and calibration circuit 124 is responsive to the amplifier output on line 123 and, like the suppression and calibration circuit 97, performs two functions. The circuit 124 adjusts the output on line 125 to a zero value when the gauge reads on an empty belt, that is, a belt on which no bulk material 14 is located. Additionally, the circuit 124 has an adjustable gain which adjusts the level of the signal on line 125 to provide a full scale value at the maximum total weight to be encountered in a given application.

A linearizer 126 functions in a manner similar to the linearizer 100 to provide on output line 127 an analog electrical signal, the amplitude of which is a linear function of the total weight of the bulk material. An integrating circuit 129 is responsive to the linearized output on line 127 and functions to integrate the input for successive equal specified duration intervals $I_{g1}, I_{g2}, I_{g3}, I_{g4}, \ldots$. The beginnings of successive interval $I_{g1}, I_{g2}, I_{g3}, I_{g4}, \ldots$ are defined by successive start signals on line 130 synchronized with the successive enable signals on line 93, while the successive interval end points are defined by successive transfer signals on line 134 generated in synchronism with the storage transfer signals on line 91. Successive reset signals on line 132 generated in synchronism with the successive counter reset signals on line 92 functions to reset the integrator 129 at the end of the successive intervals $I_{g1}, I_{g2}, I_{g3}, I_{g4}, \ldots$. The start, reset and transfer signals on lines 130, 132 and 134 are generated by interval timer 150.

An analog store 136 responsive to the output of the integrator circuit 129 on line 135 stores the output of the integrator circuit when such is transferred thereto as a consequence of the transfer signal input to the integrator on line 134. The ouptut of the analog store circuit 136 on line 106 at any given point in time is correlated to the total weight of the bulk material of the preceding complete interval $I_{g1}, I_{g2}, I_{g3}, I_{g4}, \ldots$ It is this signal on line 106 which is used to compensate the signal on line 102 for the hydrogen content of the bulk material (moisture excluded). The signal on line 106 is also input to the divider 110 to produce on line 112 a signal correlated to the percentage by weight of moisture in the bulk material.

If desired, the output of the divider circuit 110 on line 112 correlated to the percentage by weight of the moisture of the bulk material can be input to an operational amplifier to produce on output line 142 a signal correlated to the quantity (1 − moisture weight/total weight). The output signal from the operational amplifier on line 142 is then input to a multiplier circuit 144 which functions to muliply the input on line 142 by a signal input on line 146 correlated to the total weight of the bulk substance, producing on line 148 a signal correlated to the bone dry weight at the bulk substance, that is, the weight of the bulk substance on the conveyor exclusive of moisture contained therein.

The interval timer 150 functions to set the duration of, and synchronize, the intervals $I_{n1}, I_{n}2, I_{n3}, I_{n4}, \ldots$ during which the slow neutron pulse counter 88 accumulates a slow neutron count and the intervals $I_{g1}, I_{g2}, I_{g3}, I_{g4}, \ldots$ during which the gamma integrator 129 integrates the gamma signal. In operation, the timer 150 produces successive synchronized outputs on lines 93 and 130 to the neutron pulse discriminator 96 and the integrator 129 to respectively pass slow neutron pulses to the slow neutron counter 88 for accumulation therein during intervals $I_{n1}, I_{n2}, I_{n3}, I_{n4}, \ldots$ and to initiate an integrating interval $I_{g1}, I_{g2}, I_{g3}, I_{g4}, \ldots$ of the gamma integrator 129. The timer 150 also generates successive synchronized transfer signals on line 91 and 134 to the digital store 90 and integrator 129 to successively transfer at the end of accumulating intervals $I_{g1}$ and $I_{n1}, I_{g2}$ and $I_{n2}, I_{g3}$ and $I_{n3}, I_{g4}$ and $I_{n4}, \ldots$ the counts in the pulse counter 88 to the digital store 90 and the gamma integrator 129 to the analog store 136. Substantially simultaneously with the generation of each set of transfer signals on lines 91 and 134, the timer 150 generates a set of reset signals on lines 92 and 132 to reset the slow neutron pulse counter 88 and the gamma integrator 129, readying the slow neutron counter 88 and gamma integrator 129 for the next slow neutron and gamma successive accumulating interval.

The output of the moisture channel 88 on line 108 and the output of the total weight channel 82 on line 106 at any given point in time is correlated to the moisture weight and total weight accumulated by the counter 88 and the integrator 129 during the previous interval of the timer 150. For example, the output of the moisture weight channel on line 108 during interval $I_{n3}$ corresponds to the count developed by the slow neutron pulse counter 88 during the preceding neutron count interval $I_{n2}$. Similarly, the output from the total weight channel 82 on line 106 during interval $I_{g3}$ corresponds to the interval generated by the gamma integrator 129 during the preceding accumulating interval $I_{g2}$. In like manner, the signal on percentage moisture output line 86 during any given interval, such as interval $I_{m3}$, corresponds to the weight percentage moisture signal output from the divider 112 corresponding to the preceding interval $I_{m2}$.

The intervals $I_{m1}, I_{m2}, \ldots; I_{n1}, I_{n2}, \ldots;$ and $I_{g1}, I_{g2}, \ldots$ can range anywhere between 1 and 100 seconds, although a preferred range is between 20 and 80 seconds. If the intervals are too short, proper accommodation for the statistical nature of atomic events is not made and measurement errors result. Likewise, if the intervals are too long, the weight percentage moisture signal becomes less "real-time" in nature, that is, is less representative at any given time of the instantaneous percentage moisture of the material passing through the gauge.

Figure 13A:
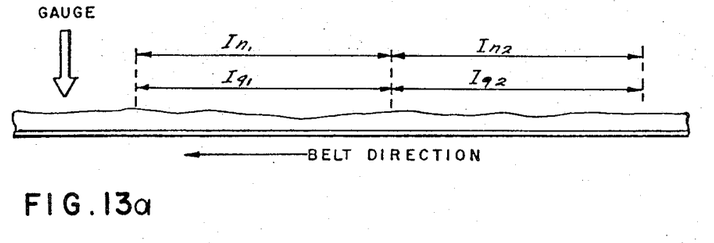
Figure 13B:
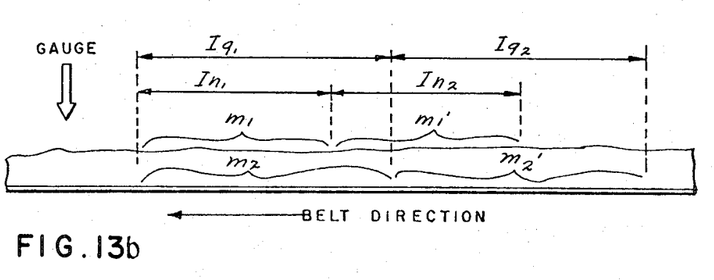

The accumulating intervals $I_{n1}, I_{n2}, \ldots$ and $I_{g1}, I_{g2}, \ldots$ for both the moisture weight channel 80 and the total weight channel 82 must be both equal to each other as well as synchronized, as shown in FIG. 13 (a). If the accumulating intervals $I_{n1}$ and $I_{g1}, \ldots$ of the two channels 80 and 82 are unequal in duration, as shown in FIG. 13 (b), the outputs of the two channels correspond to different lengths of belt 12 passing through the gauge, and hence to different masses $m1$ and $m2$ of the bulk material 14. For example, if the accumulating intervals $I_{g1}, I_{g2}, \ldots$ of the total weight channel are longer than intervals $I_{n1}, I_{n2}, \ldots$ of the moisture weight channel, the percentage moisture weight output from the divider 110 is erroneously small since the total weight integrator is integrating for a longer period. Similarly, if the moisture weight channel counting intervals $I_{n1}, I_{n2}, \ldots$ are longer than the total weight accumulating intervals $I_{g1}, I_{g2}, \ldots$ the weight percentage moisture output signal from divider 110 is erroneously large since the slow neutron pulse counter counts for a period longer than the gamma integrator integrates.

Figure 13C:
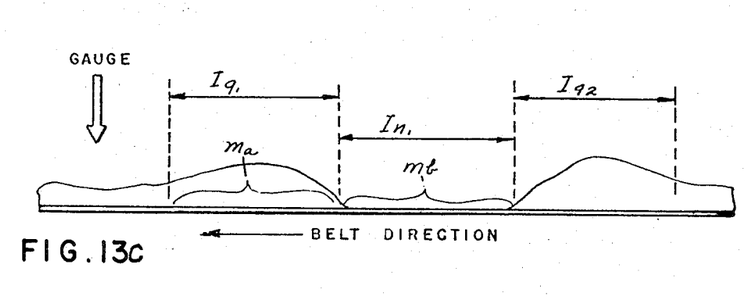

It is also essential that the accumulating intervals of the moisture channel 80 and the total weight channel 82 be synchronized. This is particularly critical where the loading on the conveyor belt changes rapidly, such as where the belt is used in a batch-type loading environment, as is the case when the belt is loaded with ore from buckets. If the accumulating intervals $I_{o1}$ and $I_{n1}$, . . . are equal but not synchronized as shown in FIG. 13(c), one channel accumulates during its interval $I_{o1}$ corresponding to a specified sample of material $m_a$ passing through the gauge during that interval, while the other channel accumulates for an equal interval $I_{n1}$, but at a different point in time, thereby producing a signal corresponding to a different stream of material $m_b$ passing through the gauge. In batch-type operations where the loading on a belt 12 is uneven, during the interval $I_{o1}$ that one channel is accumulating there may be a deposit of bulk substance $m_1$ on the belt, while during the interval $I_{n1}$ that the other channel is accumulating there may not be any material $m_2$ on the conveyor. As a consequence, when the accumulated signals from both channels are divided to yield a weight percentage moisture signal, an error is produced.

As noted previously, the length of the source holder 28, that is, its dimension measured transversely of the belt 12, is only a fraction of the traverse dimension of the belt, which fraction is at a point where the bulk substance loading is deepest. In a preferred form the length of the source holder 28 is approximately one-third of the transverse dimension of the belt, although the length of the source holder 28 may be made as small as approximately one-fourth the transverse dimension of the belt or as large as three-fourths of the transverse dimension of the belt. The importance of irradiating substantially less than the entire transverse dimension of the belt and doing so at the point of maximum bed depth is that it reduces errors in the measurement of the percentage by weight of moisture contained in the bulk substance 14 due to variations in hydrogen content of the belt 12 along its length, should such belt be made of hydrogenous material.

The belt 12, when fabricated of rubber or other hydrogenous material, slows fast neutrons from the source holder 28, which slow neutrons are detected by the slow neutron detector 22. As noted in connection with the discussion of the circuit of FIG. 8, the component of the output of the slow neutron detector 22 attributable to the average number of slow neutrons produced by the hydrogenous belt 12 is removed by the belt suppression and calibration circuit 97 which effectively causes the output on line 98, on the average, to be zero when the gauge reads on an empty belt. When the gauge is reading on an empty belt, slow neutrons are produced by the hydrogenous material of the belt and detected by the slow neutron detector 22, ultimately providing an input to the suppression and calibration circuit 97 on line 96. However, this input corresponding to the slow neutrons generated by the hydrogenous material of the empty belt 12 is, on the average, cancelled by the calibration and suppression circuit 97 producing, on the average, a zero level signal on line 98 when the belt is empty. If the hydrogenous content of the belt 12 is uniform along its length, the "zeroing out" process described, in which the average belt hydrogen component is subtracted, would fully compensate for the hydrogenous nature of the belt, and errors in the percentage by weight of moisture contained in the bulk substance 14 would not occur as a consequence of hydrogenous nature of the belt 12.

Unfortunately, rubber belts 12 of the type found in conventional industrial processing operations do not have uniform hydrogen content along their length by virtue of variations in thickness of the belt and/or variations in chemical homogeneity of the belt. Thus, in a conventional belt 12 the hydrogen content of the belt at one point along its length often differs from the hydrogen content of the belt at another point along its length. Since the process of "zeroing out" the gauge on an empty belt performed by the suppression and calibration circuit 97 is obtained by measuring the average belt hydrogen component along the length thereof, the gauge in reality is only "zeroed out" on an "average" basis. When in use, a section of the belt 12 is in the guage having a thickness greater than that of the average belt section determined at the time the gauge was "zeroed" on an empty belt, only a portion of the slow neutrons produced by the belt 12 will be cancelled by the suppression and calibration circuit 97, the portion cancelled corresponding to the average belt section with respect to which the gauge was "zeroed out" with no bulk materials 14 on the belt. Similarly, when a section of the belt 12 is in the gauge having a thickness less than the average thickness of the belt determined when the gauge was "zeroed out" with no material on the belt, less slow neutrons are produced by the belt 12, resulting in an erroneously large cancellation by the suppression and calibration circuit 97.

To minimize the foregoing error introduced by varying hydrogenous content of the belt 12 along its length, it is desirable to irradiate a fractional section of the belt, and further to irradiate the belt where the bed depth is greatest. In practice it has been found that irradiation of approximately one-third of the transverse dimension of the belt provides satisfactory operation. While irradiation of approximately one-third the transverse dimension of the belt is preferred, the fractional transverse belt irradiation can be as low as approximately one-fourth and as high as approximately three-fourths. In this invention wherein slow neutrons generated by only a fraction of the cross-section of the bulk material are detected, and wherein the detected fractional cross-sectional area is in the center of the belt where normally the bulk material is deepest, a greater signal-to-noise ratio is produced. As used herein, "noise" includes variations in the neutron detector output due to changes in belt hydrogen content along the length of the belt. Inasmuch as the source holder 28 does irradiate at least some portion of the belt 12, albeit a fractional portion, that portion of the belt which is irradiated will have some variation in hydrogenous content along the length of the belt introducing some minor error, for the reason noted previously, namely, "zeroing out" the gauge on an empty belt for an average thickness belt section which may have a different hydrogen content than another section of the belt. However, in this gauge, wherein slow neutrons are detected only from the central portion of the belt and bulk material whereat the bulk material is normally deeper, the fraction of the total slow neutrons generated by the belt and bulk material (including moisture contained therein) which is attributable to the belt will be smaller than if slow neutrons from the marginal portions of the belt were detected where the depth of the bulk material is normally less. Stated differently, if the slow neutrons generated by the irradiated portion of the belt are considered "noise," and the slow neutrons generated by the bulk material and moisture contained therein are considered "signal," by detecting neutrons from only the central fractional portion of the belt where the depth of the bulk material is normally deepest, the signal-to-noise ratio will be larger than if slow neutrons were detected from a marginal portion of the belt wherein the depth of the bulk material is normally less than it is at the center. Obviously, the greater the signal-to-noise ratio, the greater the accuracy and reliability of the measurement.

Figure 12:
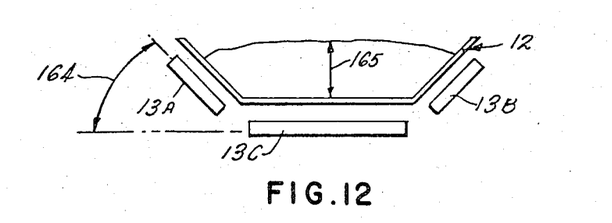
FIG. 12 is a schematic elevational view of a gauge of this invention showing a preferred orientation of the conveyor belt and supporting idler rolls.

To further enhance the signal-to-noise ratio, the transverse configuration of the belt 12 can be adjusted such that the outer idler rollers 13A and 13B depicted in FIG. 1, 3 and 12 may be adjusted relative to the central horizontal idler rollers 13A and 13B and the horizontal central roller 13C such that the angle 164 between the outer rollers 13A and 13B and the horizontal roller 13C provides a depth of material 165 at the center of the belt sufficient to give the desired signal-to-noise ratio.

For a given percentage moisture content, as the density of the bulk material decreases, the angulation of the rollers 13A and 13B relative to the central roller 13C should be increased to increase the depth of the bulk material 165 at the center thereof. In a preferred form, and assuming a moisture content of 50 percent, a depth 165 of bulk material of 3½ inches is a desired minimum if the bulk material is wood chips or a material of similar density, while the preferred minimum depth 165 may be one inch if the bulk material is sinter mix or other material of equivalent density. Obviously the minimum center depth 165 will vary above or below these preferred minimums as the density of material falls below and above the densities of wood chips and sinter mix, respectively.

A very significant advantage of this invention, particularly the preferred embodiment wherein only approximately one-third the transverse dimension of the belt 12 is irradiated by the source holder 28, is that as a general rule the size of the source housing, shielding and associated equipment, and hence its cost, are significantly reduced from those systems wherein the source extends across the entire transverse dimension of the belt and irradiates substantially the entire cross-section of the bulk material 14.

In selecting the energy of the fast neutrons emitted by the source holder 28 it is desirable, for a given range of variation in the weight percentage moisture of the sample, to select the lowest possible fast neutron radiation energy level which will not result in saturation at the highest expected weight percentage moisture. Stated differently, for a given expected range of variation in the weight percentage moisture, the fast neutron radiation energy level should be selected such that when the weight percent moisture is at the highest percent contemplated for the range not all of the fast neutrons will be slowed. When the fast neutron radiation energy level is selected as indicated, the sensitivity of the gauge will be maximized since the probability of an interaction between a hydrogen atom and a fast neutron will be maximum.

Figure 11:
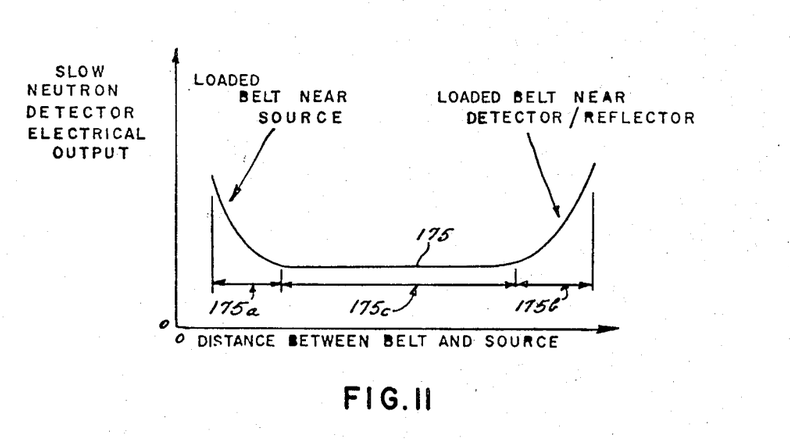
FIG. 11 is a plot of the slow neutron detector electrical output versus the distance between the belt and source for a given weight of moisture on the belt.

It is desirable to make the gauge insensitive to the vertical position of the loaded belt relative to the source and detector. In this invention this is achieved by providing a neutron reflector above the belt, and in particular above the detector, which reflects back into the bulk substance fast neutrons which have not been slowed down in the course of passing through the bulk substance. With such a reflector, the gauge characteristic 175 shown in FIG. 11 results. Specifically, FIG. 11 is a plot 175 of the slow neutron detector electrical output versus the distance between the loaded belt 12 and source holder 28 for a moisture gauge having a loaded belt whose position in the vertical direction is variable between a fast neutron source and a slow neutron detector equipped with a neutron radiation reflector, the distance between the fast neutron source and neutron detector/reflector itself being fixed regardless of vertical position of the loaded belt relative to the source and detector/reflector. With reference to FIG. 11, it is noted that for a given weight of moisture on the belt the slow neutron detector electrical output increases in region 175A as the belt approaches the fast neutron source. As the loaded belt approaches the fast neutron source, more fast neutrons from the source pass through the belt, and hence the slow neutron detector electrical output increases. In effect, the solid angle of radiation from the fast neutron source is being utilized more efficiently. Similarly, the slow neutron detector output increases in region 175B where the loaded belt nears the neutron detector/reflector. As the loaded belt nears the neutron detector/reflector, more fast neutrons reflected from the reflector pass back through the bulk material to become slowed down, producing more slow neutrons. The increased slow neutron generation increases the electrical output of the slow neutron detector. Between regions 175A and 175B, namely, in region 175C, the slow neutron detector electrical output is substantially constant regardless of the exact position of the belt relative to the fast neutron source and neutron detector/reflector within the specified range.

Another advantage of using the neutron reflector, but not the principal reason therefor in this invention, is that it increases the efficiency of slow neutron detection by the detector. This is due to the fact that slow neutrons passing through the neutron detector which are not initially detected are reflected back through the neutron detector where they again can be subjected to detection.

Obviously, it is desirable that the slow neutron detector electrical output for a fixed weight of moisture on the belt remain substantially constant independent of the exact vertical position of the loaded belt relative to the fast neutron source and neutron detector/reflector, otherwise measurement errors result. Accordingly, and to optimize the insensitivity of the gauge to loaded belt position, the loaded belt 12 is located in the flattened range 175C, thereby minimizing measurement errors occasioned by variations in the position of the belt relative to the fast neutron source and neutron detector/reflector.

Figure 14A:
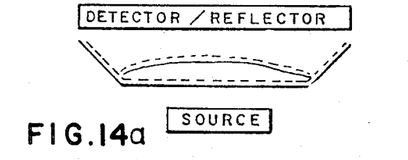

The importance of providing the neutron reflector and obtaining the flattened characteristic 175 and thereafter locating the loaded belt in the intermediate flat range 175C, cannot be underestimated. First, the gauge is rendered substantially insensitive to flutter of the belt in the vertical direction as a consequence of vibration or the like. With reference to FIG. 14(a), note that as the belt flutters between the solid and dotted line positions, the constant cross-section bulk material moves vertically, i.e., closer to the detector/reflector. Yet, because the loaded belt is positioned as described, the detector output does not vary for the constant moisture load and measurement errors are not introduced by such vertical positional change.

Figure 14B:
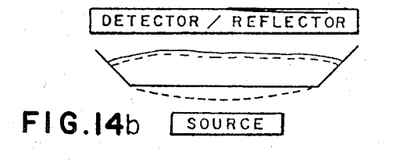

Additionally, the gauge is insensitive to variations in loading of the belt. Under conditions of light belt loading, the belt is likely to be closer to the detector/reflector, while under conditions of heavy belt loading the belt is likely to be closer to the source than to the detector/reflector. These changes in location of the belt under conditions of heavy and light loading will not introduce measurement errors. With reference to FIG. 14(b), note that as a constant cross-sectional area load becomes more dense, the position of the load moves from the dotted line position to the solid line condition, that is, moves closer to the source. By positioning the loaded belt in the manner described above, this variation in vertical positioning of the belt will not introduce measurement error.

Figure 14C:
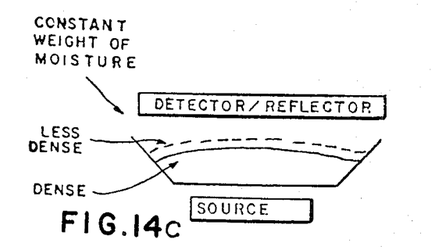

Another advantage of positioning the loaded belt as indicated is that, for a given weight of moisture on the belt, as the density of the bulk material decreases, causing the depth of bulk material on the belt to increase, errors are not introduced notwithstanding that the bulk material moves closer to the detector/reflector. With reference to FIG. 14(c), the solid line depicts a relatively dense loading, while the dotted line depicts a loading of lesser density, the same weight of moisture being contained in each load. Since the same absolute weight of moisture is contained in both the dense and the less dense loads depicted in solid and dotted lines, respectively, the electrical output of the slow neutron detector should remain the same, notwithstanding that in the less dense load condition the bulk material is closer to the detector/reflector. If the loaded belt is located in the manner indicated above, that is, in a flattened region 175C, the slow neutron detector output will remain constant notwithstanding that the less dense material is closer to the detector/reflector.

Figure 14D:
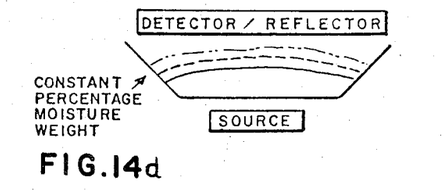

Finally, by locating the loaded belt in the manner indicated, as a load on the belt of the same weight percentage moisture incrementally increases, the electrical output of the detector will incrementally increase a proportional amount. With reference to FIG. 14(d), note that as a constant weight percentage moisture load increases in increments from the solid line loading to the dotted line loading condition, and then to the phantom line loading condition, the bulk material moves closer to the detector/reflector. If the loaded belt were located in either of the regions 175A or 175B, this movement of the load closer to the detector/reflector would produce measurement errors. However, such errors are not produced in this invention wherein the loaded belt is located in the region 175C.

A measurement of the weight percentage moisture contained in a bulk material is obtained, as described previously, by dividing the moisture weight output of the moisture channel 80 by the total weight output of the total weight channel 82. From the standpoint of accuracy, it is desirable that the cross-sectional area of the bulk material from which the slow neutrons measured by the slow neutron detector are generated be equal to the cross-sectional area of the bulk material through which the gamma radiation measured by the gamma detector is transmitted. If these cross-sectional areas are equal, the detected slow neutron and gamma radiation channel outputs, which are subsequently divided to produce the weight percentage moisture measurement, correspond to the same cross-sectional area of the bulk material.

Figure 9:
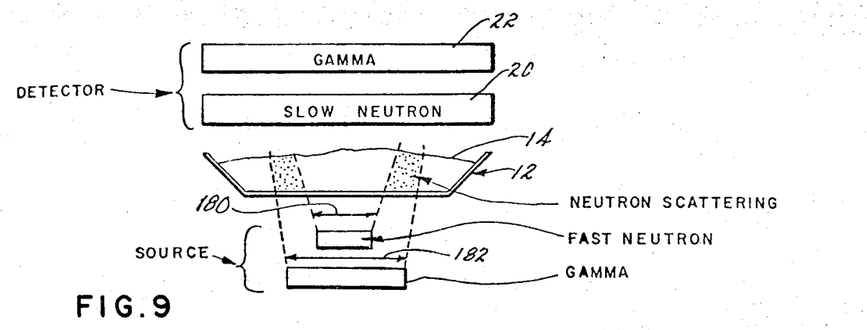
FIG. 9 is a schematic elevational view of a first gauge embodiment which facilitates detecting slow neutrons and transmitted gamma radiation from a predetermined fractional cross-sectional area of the bulk material, wherein only the predetermined fractional cross-sectional area is subjected to gamma and fast neutron radiation.

Since the detection of slow neutrons and gamma radiation from equal cross-sectional areas of the bulk material is desired, in the preferred embodiment wherein the source 28 extends only a fraction of the distance across the width of the belt and the detectors 20 and 22 extend across the entire belt, it is desirable to irradiate the bulk material with fast neutrons through a smaller angle 180 than the angle 182 of the bulk material through which the bulk material is irradiated by the gamma source, as shown in FIG. 9. While a lesser angle 180 of the bulk material 14 is irradiated with fast neutrons, the fast neutrons have a tendency to be scattered by the bulk materials to a greater extent than is the gamma radiation, with the result that the cross-sectional area of the bulk material ultimately subjected to fast neutron radiation is equal to the cross-sectional area of the bulk material subjected to gamma radiation. As the energy level of the fast neutrons decreases, the scattering within the bulk material 14 increases, and hence the radiation angle 180 of the fast neutrons must be decreased to maintain a constant cross-sectional area of the bulk material subjected to fast neutron radiation. Similarly, as the energy level of the fast neutrons increases, the tendency of fast neutron scattering within the bulk material is decreased, and the fast neutron radiation angle 180 must be increased to maintain a constant cross-sectional area of bulk material subjected to fast neutron radiation.

The source rods 70 and 50 described in connection with FIGS. 7 and 4 have been found to provide the desired equality of cross-sectional area of irradiation for fast neutrons and gamma radiation in low percentage moisture materials and high percentage moisture materials, respectively. Note that in each case the fast neutron source (or sources) is located interiorly of the gamma radiation sources, thereby providing a fast neutron radiation angle of lesser extent than the gamma radiation angle.

Figure 10:
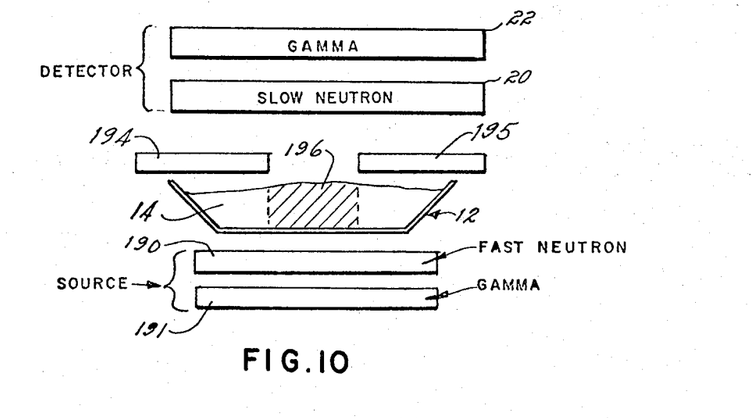
FIG. 10 is a schematic elevational view of a second gauge embodiment which facilitates detecting slow neutrons and transmitted gamma radiation from a predetermined fractional cross-sectional area of the bulk material, wherein the entire cross-sectional area of the bulk material is irradiated with fast neutrons and gamma radiation, but only radiation emanating from the predetermined fractional cross-sectional is sensed by the slow neutron and gamma detectors.

Detection of slow neutrons and gamma from equal cross-sectional areas of the bulk material has been described in connection with the embodiment of FIGS. 1-7. In this embodiment control of the cross-section of the bulk material irradiated has been accomplished by controlling the extent of the radiation angles of the fast neutron and gamma sources. Detecting slow neutron and gamma radiation from equal cross-sectional areas of the bulk substance can be accomplished in a different manner, as shown in FIG. 10. Specifically, with reference to FIG. 10 fast neutron and gamma sources 190 and 191 are depicted which extend substantially across the entire transverse dimension of the belt 12, thereby irradiating substantially the entire cross-section of the bulk material 14. Located above the bulk material 14 are slow neutron and gamma detectors 192 and 193 extending across substantially the entire width of the bulk material. Collimating plates 194 and 195 positioned in front of the detectors 192 and 193 are provided. Collimating plates 194 and 195 function to limit the radiation detected by each of the slow neutron and gamma detectors 192 and 193 to the same cross-sectional area 196 (shown shaded), which cross-sectional area is only a fraction of the entire cross-section. Significantly, both the slow neutron and gamma detectors 192 and 193 respond only to radiation emanating from the same cross-sectional area 196 of the bulk material 14, which cross-sectional area is only a fraction of the total, notwithstanding that the bulk material 14 is irradiated substantially across its entire cross-sectional area by the fast neutron and gamma sources 190 and 191. The embodiment depicted in FIG. 10, since it detects radiation emanating from the cross-sectional areas which are both fractional and the same, produces many of the advantages provided by the gauge embodiment of FIGS. 1–7.

As an alternative to using a collimator in connection with elongated detectors in the embodiment of FIg. 10, the collimator could be eliminated and the length of the detectors reduced such that they are significantly smaller than the length of the source.

While the invention has been described in connection with certain preferred embodiments in which the gamma and neutron irradiation and detection was accomplished in a transmission mode, it is possible to practice the invention using either or both the gamma and/or neutron detectors in a backscatter mode.

From the foregoing disclosure of the general principles of the present invention and the above description of a preferred embodiment, those skilled in the art will readily comprehend various modifications to which the present invention is susceptible. Accordingly I desire to be limited only by the scope of the following claims:

I claim:

1. A gauge for determining the weight percentage moisture of a bulk substance transported in a longitudinal direction on a moving conveyor, said gauge comprising:
   a source of fast neutrons for directing fast neutrons into said bulk substance transported thereby,
   a source of gamma radiation for directing gamma radiation into said bulk substance transported thereby,
   a detector for detecting neutrons emanating from said bulk material and producing a first electrical signal correlated thereto, and for detecting gamma radiation emanating from said bulk material and generating a second electrical signal correlated thereto, and
   a signal processing circuit including
   a. a moisture channel responsive to said first electrical signal and having a first accumulator for providing successive outputs correlated to the number of neutrons detected during successive intervals $I_{n1}, I_{n2}, \ldots$, which intervals are associated with successive masses of moisture $m_a, m_b, \ldots$ contained in said bulk material passing through said gauge;
   b. a total weight channel responsive to said second electrical signal and having a second accumulator for providing successive outputs correlated to the gamma radiation detected during successive intervals $I_{g1}, I_{g2}, \ldots$, which intervals are associated with successive masses of bulk material $m_1, m_2, \ldots$ passing through said gauge;
   c. a timer connected to each of said channels for synchronizing and equalizing the neutron accumulating intervals $I_{n1}, I_{n2}, \ldots$ and the gamma accumulating intervals $I_{g1}, I_{g2}, \ldots$ to provide a condition in which moisture masses $m_a, m_b, \ldots$ are contained in bulk material masses $m_1, m_2, \ldots$; and
   d. an arithmetic circuit responsive to said successive outputs of each channel for providing an output correlated to the weight percentage moisture of said bulk material.

2. The gauge of claim 1 wherein said equal intervals $I_{n1}, I_{n2}, \ldots$ and $I_{g1}, I_{g2}, \ldots$ have a duration in the approximate range of 1 to 100 seconds.

3. The gauge of claim 2 wherein said equal intervals $I_{n1}, I_{n2}, \ldots$ and $I_{g1}, I_{g2}, \ldots$ have a duration in the approximate range of 20 to 80 seconds.

4. A gauge for determining the bone dry weight of a bulk substance transported in a longitudinal direction on a moving conveyor, said gauge comprising:
   a source of fast neutrons for directing fast neutrons into said bulk substance transported thereby,
   a source of gamma radiation for directing gamma radiation into said bulk substance transported thereby,
   a detector for detecting neutrons emanating from said bulk material and producing a first electrical signal correlated thereto, and for detecting gamma radiation emanating from said bulk material and generating a second electrical signal correlated thereto, and
   a signal processing circuit including
   a. a moisture channel responsive to said first electrical signal and having a first accumulator for providing successive outputs correlated to the number of neutrons detected during successive intervals $I_{n1}, I_{n2}, \ldots$, which intervals are associated with successive masses of moisture $m_a, m_b, \ldots$ contained in said bulk material passing through said gauge;
   b. a total weight channel responsive to said second electrical signal and having a second accumulator for providing successive outputs correlated to the gamma radiation detected during successive intervals $I_{g1}, I_{g2}, \ldots$, which intervals are associated with successive masses of bulk material $m_1, m_2, \ldots$ passing through said gauge;
   c. a timer connected to each of said channels for synchronizing and equalizing the neutron accumulating intervals $I_{n1}, I_{n2}, \ldots$ and the gamma accumulating intervals $I_{g1}, I_{g2}, \ldots$ to provide a condition in which moisture masses $m_a, m_b, \ldots$ are contained in bulk material masses $m_1, m_2, \ldots$; and
   d. an arithmetic circuit responsive to said successive outputs of each channel for providing an output correlated to the bone dry weight of said bulk material.

5. The gauge of claim 4 wherein said equal intervals $I_{n1}, I_{n2}, \ldots$ and $I_{g1}, I_{g2}, \ldots$ have a duration in the approximate range of 1 to 100 seconds.

6. The gauge of claim 5 wherein said equal intervals $I_{n1}, I_{n2}, \ldots$ and $I_{g1}, I_{g2}, \ldots$ have a duration in the approximate range of 20 to 80 seconds.

* * * * *